United States Patent [19]

Hipps

[11] 4,402,553

[45] Sep. 6, 1983

[54] PRESSURE CONTROLLED ELECTRO-HYDRAULIC BRAKE SYSTEM

[76] Inventor: Larry W. Hipps, 506 Colorado St., Sherman, Tex.

[21] Appl. No.: 250,544

[22] Filed: Apr. 3, 1981

Related U.S. Application Data

[62] Division of Ser. No. 88,349, Oct. 26, 1979, Pat. No. 4,280,737.

[51] Int. Cl.³ .............................................. B60T 13/68
[52] U.S. Cl. ..................................... 303/3; 188/3 R; 251/138; 303/7
[58] Field of Search .................. 188/3 R, 3 H; 303/3, 303/7, 10, 11, 52, 61; 251/131, 133, 134, 138

[56] References Cited

U.S. PATENT DOCUMENTS

| | | | |
|---|---|---|---|
| 2,190,120 | 2/1940 | Kohler | 188/3 H X |
| 3,034,598 | 5/1962 | Lafaye | 188/3 R |
| 3,985,395 | 10/1976 | Watanabe | 188/3 R X |
| 4,285,497 | 8/1981 | Guttel | 251/138 |

Primary Examiner—Duane A. Reger
Attorney, Agent, or Firm—Richards, Harris & Medlock

[57] ABSTRACT

A braking system for towed vehicles is disclosed which provides for controlled application of hydraulic brakes in a towed vehicle in response to the application of the brakes by the driver of the towing vehicle. An electromagnetic variable valve means provides the responsive braking pressure in a towed vehicle by employing an electric current signal from the towing vehicle to create an electromagnetic force which is balanced against the hydraulic pressure present in the towed vehicle's brakelines. The variable valve means preferably includes a valve housing 44, a valve cap 16, electromagnet means 46, valve cap switch means 18 for activating a hydraulic pumping means, a hydraulic relief control valve stem means 52 and the pressure monitoring pin means 54

6 Claims, 4 Drawing Figures

PRESSURE CONTROLLED ELECTRO-HYDRAULIC BRAKE SYSTEM

This application is a division of U.S. patent application Ser. No. 088,349, filed Oct. 26, 1979, now U.S. Pat. No. 4,280,737, issued July 28, 1981.

TECHNICAL FIELD

This invention relates to a brake actuating system wherein varied electric current is employed to create a variable magnetic force used both to initiate hydraulic pressure to the brake lines of a vehicle and thereafter control such pressure. In another aspect, this invention relates to a brake actuating system for use in conjunction with a towing vehicle-towed vehicle combination, whereby increased braking pressure in the towing vehicle is communicated to the brake actuating system of the towed vehicle by increasing electric current which by means of a unique electromagnetic variable valve means, is translated to increase hydraulic pressure delivered to the hydraulic brakes of the towed vehicle. In still a further aspect, the present invention relates to an electromagnetic variable valve means which regulates the pressure supplied to a desired hydraulic brake line by monitoring the amount of time the hydraulic fluid pumping means operates and the pressure created in the brake line as a result thereof.

BACKGROUND ART

Until recently, braking systems employed in connection with towed vehicles such as horse trailers, for example, were usually one of three conventional types of systems. These include: electric braking systems, surge hydraulic braking systems, and vacuum over hydraulic braking systems. The electric type braking system conventionally includes electromagnets mounted inside the brake drum of each wheel of the towed vehicle, which upon application of electric current attach themselves to an armature plate mounted inside the brake drum. The rotating motion of the wheel then carries the attached electromagnet with it causing an armature attached to the electromagnet to rotate and expand braking bands against the brake drum. Electric current to the electromagnet is supplied via a rheostat activated by hydraulic pressure from the brakes of the towing vehicle or by a hand control mounted in the passenger compartment of the towing vehicle. The disadvantages of such a system include the fact that during normal operation braking pressure is supplied first to the hydraulic brakes of the towing vehicle and then, as the electric brakes of the towed vehicle are activated, a noticeable lurch occurs which may affect the control of the operator of the towing vehicle during braking. Further, variance in electromagnetic strength among the electromagnets in each wheel may cause uneven braking and further control problems. Such a system is also prone to electrical wiring problems because electrical wires carrying current to each electromagnet are exposed between the wheel and the frame of the towed vehicle. Finally, while such electrical braking systems are sometimes supplied with an emergency breakaway kit, which includes a nonrechargeable dry cell battery which automatically completes the circuit to the electromagnet upon physical separation of the towed and towing vehicles, these emergency breakaway systems are completely dependent on the performance of such dry cell batteries which may, over a period of time, lose sufficient charge to properly activate the electric brakes.

A second type of conventional braking system used in conjunction with towed vehicles are surge hydraulic brakes. These types of systems conventionally include a piston and cylinder mounted between the towed vehicle and the towing vehicle in a manner such that when the brakes of the towing vehicle are applied, the momentum of the towed vehicle causes the piston to move into the cylinder resulting in hydraulic pressure which is transferred to the hydraulic brake cylinders of the towed vehicle. Disadvantages of this type of system include the apparent fact that in case of brake failure in the towing vehicle, no trailer brake pressure may be applied. Further, there is no provision for hand activation of such a system, thus making this type of system illegal under the relevant laws of some states. As is also apparent from the foregoing brief description of a conventional surge hydraulic braking system, full braking power is applied to the towed vehicle when the towing vehicle is operated in a reverse gear, whether such braking is desired or not.

The third type of conventional braking system is the vacuum over hydraulic brake system. This type of system conventionally includes a vacuum chamber, containing a diaphragm, mounted in the towed vehicle to which vacuum is supplied from the intake manifold of the engine of the towing vehicle. Upon activation of this type of braking system, atmospheric pressure is allowed to enter one side of the vacuum chamber, thus causing the diaphragm to expand into the evacuated side of the chamber, thereby mechanically moving a rod attached to the diaphragm which advances a piston in the master cylinder and creates hydraulic pressure to the hydraulic brakes of the towed vehicle. Release of the braking pressure is accomplished by reestablishment of a vacuum on both sides of the diaphragm within the vacuum chamber. The disadvantages of such a system include the necessity of leak proof vacuum lines to the vacuum source (usually the engine of the towing vehicle) and the fact that the operation of such systems is relatively slow causing a time difference between the application of the brakes of the towing vehicle and those of the towed vehicle. As is also apparent, complete loss of brakes in the towing vehicle will occur in the event of engine failure or separation or leak in the vacuum lines leading to the towed vehicle.

DISCLOSURE OF INVENTION

The electro-hydraulic brake actuating system of the present invention overcomes the disadvantages of the presently available trailer brake actuating systems and provides for the smooth application of the brakes of a towed vehicle in response to a like application of the brakes of the towing vehicle. According to the invention, conventional hydraulic brakes in a towed vehicle are actuated simultaneously with the brakes of the towing vehicle in response to increasing electric currents supplied to a novel variable valve means which comprises a portion of the braking system of the present invention, increasing electrical current being supplied from the battery or other power source of the towing vehicle, via an electric current varying means such as, for example, a rheostat. Thus, the towed vehicle is slowed via conventional hydraulic brakes without the necessity of any hydraulic connection between the towed and towing vehicles.

Basic operation of the pressure controlled hydraulic brake system of the subject invention can be summarized as follows. A rheostat, or other current varying means (such as commercially available brake controls designed for use with the electric brake systems) is employed to sense the hydraulic force exerted in the brake line of the towing vehicle and translate that hydraulic force into an electric current signal. That electric current signal is then delivered to the electromagnet of the valve of the present invention, electrical connection between the two vehicles being accomplished using any of a variety of conventional electrical connection devices. Magnetic force created by the electromagnet of the valve means of the subject invention will thus vary in response to variations in the braking force being applied in the towing vehicle. That magnetic force is employed to (a) create hydraulic pressure in the brake line of the towed vehicle by causing the hydraulic fluid pumping means to pressurize said lines, and (b) maintain the pressure in the hydraulic brake lines of the towed vehicle by acting as a regulated counter force to the hydraulic pressure in the system causing the hydraulic fluid pumping means to deliver pressure only as required by the signal received from the towing vehicle.

Thus, in operation, the electrical signal delivered to the towed vehicle from the towing vehicle when the brakes thereof are applied by the driver, creates an electromagnetic force which operates to close a control switch for a direct current electric motor which drives the hydraulic pumping means. The hydraulic pumping means charges fluid into the brake line of the towed vehicle. At the same instant, the electromagnetic force has caused the pressure relief control valve stem of the valve means of the subject invention to seat in the return fluid port of the valve causing all of the fluid being pumped by the hydraulic fluid pumping means to enter the hydraulic brake lines of the towed vehicle. As the pressure rises in the hydraulic lines of the towed vehicle, the electromagnetic force will be overcome and the hydraulic force present in the brake lines will cause a pressure monitoring pin to act as a hydraulic piston physically shifting the position of a valve cap assembly and causing the hydraulic pumping means to cease operation. If overpressure occurs in the brake line of the towed vehicle, the pressure relief control valve stem will become unseated, allowing some hydraulic fluid to flow from the brake line back into the hydraulic fluid reservoir. Further, as the electrical signal decreases in response to a lessening in braking pressure being applied by the driver of the towing vehicle, the hydraulic pressure present in the brake line of the towed vehicle will exert sufficient force on the pressure relief control valve stem to overcome the decreasing electromagnetic force acting on the valve cap and allow a smooth reduction in pressure to occur providing smooth, reduced braking in the towed vehicle.

In this manner, the electric motor driving the hydraulic pumping means need only operate for short time intervals in response to the need for increasing pressure in the hydraulic brake lines of the towed vehicle as dictated by the electromagnetic force which, in turn, represents the amount of braking pressure being applied to the hydraulic brake lines of the towing vehicle.

BRIEF DESCRIPTION OF THE DRAWINGS

A better understanding of the present invention will be facilitated by a study of the accompanying drawings in which.

DETAILED DESCRIPTION

Figure 1:
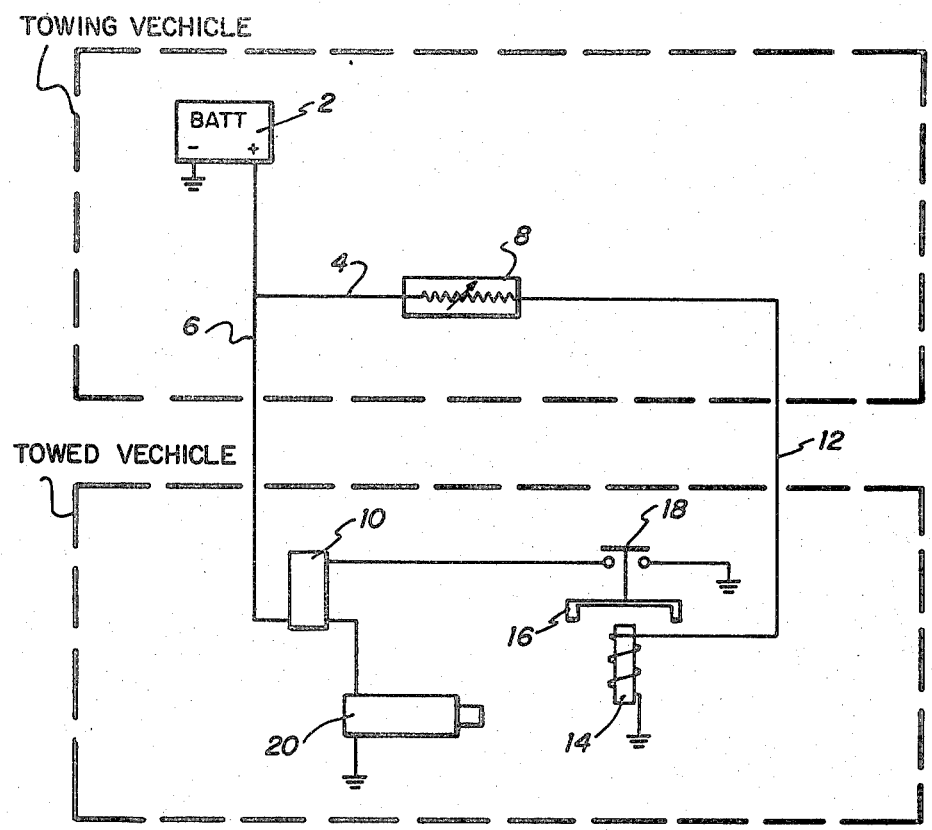
FIG. 1 is a schematic representation of the electrical circuit of the hydraulic brake actuating system of the present invention.

Now referring to FIG. 1, one embodiment of the electrical circuit of the present invention will be described in detail. In the embodiment of the present invention depicted in FIG. 1, the battery of a towing vehicle is used to supply an electrical current both to the electromagnet in the variable valve means of the towed vehicle and to the direct current electric motor which drives the hydraulic fluid pumping means. Thus, towing vehicle battery 2 is interconnected by wires 4 and 6 to current varying means 8 and motor relay switch 10, respectively. When the driver of the towing vehicle depresses the brake pedal of that vehicle, current varying means 8 sends an electric current signal via signal wire 12 to the electromagnet means 14 of the variable valve means of the present invention, further described hereinbelow. Since, at this instant in time, there is no hydraulic pressure in the brake lines of the towed vehicle, valve cap 16 is attracted downward toward electromagnetic means 14. This causes valve cap switch 18 to move from an open to a closed position, thereby completing the circuit through motor relay switch 10 causing that switch, normally in an open position, to close and provide electric current to electric motor 20. Thus, in the first instant of operation, electromagnet means 14 causes a physical shift in position of valve cap 16, which movement is employed to close the circuit to the electric motor 20 which drives the hydraulic pumping means. The hydraulic pumping means introduces hydraulic fluid, under pressure, into the valve means of the present invention and from there into the brake lines of the towed vehicle. As further described hereinbelow, once the hydraulic pressure in the brake lines of the towed vehicle overcomes the magnetic force (which is varying proportionally with the signal received from current varying means 8, and therefore with the brake pressure being applied by the driver in the towing vehicle) the hydraulic pressure in the brake lines will overcome the electromagnetic force and cause valve cap 16 to rock upward, thus opening valve cap switch 18. This, in turn, will cause motor relay switch 10 to return to an open position and break the circuit to the electric motor 20 providing power to the hydraulic pumping means. In this manner, the electric motor 20 operates only intermittently as needed to provide sufficient hydraulic pressure in the brake lines of the towed vehicle to match the signal received from the towing vehicle via signal wire 12.

Figure 2:
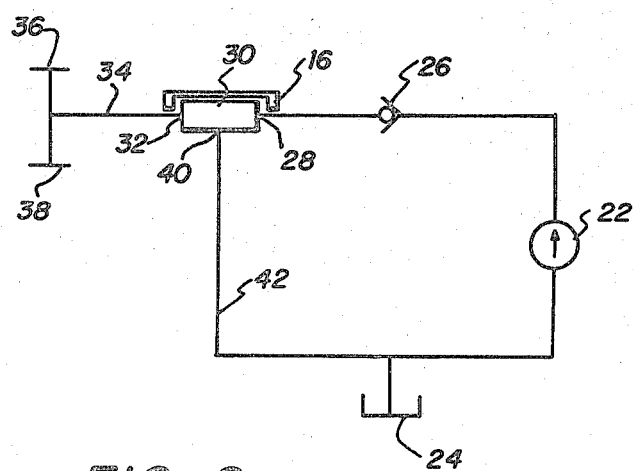
FIG. 2 is a schematic representation of the hydraulic fluid circuit of an electro-hydraulic brake actuating system of the present invention.

Now referring to FIG. 2, the hydraulic circuitry of one embodiment of the braking system of the present invention will be described. Hydraulic pumping 22, driven by electric motor 20 as described above, pumps hydraulic fluid from reservoir 24 through one way, check valve means 26 and into inlet port 28 of valve means 30. The fluid passing through valve means 30 exits at outlet port 32 and enters brake line 34 of the towed vehicle thereby applying pressure to wheel cylinders 36 and 38 of the towed vehicle. Valve cap 16 and the internal monitoring pin, inside of valve means 30, further described hereinbelow, act to balance and monitor the hydraulic pressure in valve means 30 and brake line 34 as compared with the electromagnetic force supplied to the electromagnet means 14 of valve means 30. When sufficient hydraulic pressure has developed in brake line 34, the electromagnetic force acting on valve cap 16 will be overcome by the upward action of the monitoring pin of the valve means 30. The action of the monitoring pin will cause valve cap 16 to rock and open the valve cap switch 18, as described above. Further, if overpressure is developed by pumping means 22, hydraulic fluid will be allowed to leak out of valve means 30 through fluid return port 40 and back to reservoir 24 via fluid return line 42 because of the unseating of a pressure relief control valve stem contained within valve means 30 and further described hereinbelow.

One preferred embodiment of electromagnetic valve means 30, useful in the braking system of the present invention, will now be described in detail. Before referring to FIG. 3, which is a cross sectional view of one embodiment of an electromagnetic valve means of the present invention, it will be useful to describe the operation of the valve. The basic function of the valve is to provide hydraulic pressure to the brake lines of the towed vehicle in a manner responsive to the application of braking pressure by the driver of the towing vehicle. This is accomplished by allowing hydraulic fluid to be pumped through the valve means and into the brake lines of the towed vehicle to raise the pressure in the brake line until that pressure matches or slightly exceeds the electromagnetic force acting to keep the valve cap means in position on the valve housing. The electromagnetic force is, of course, as noted above, indicative of the pressure being applied by the driver to the brake lines of the towing vehicle. Once the hydraulic pressure in the brake lines of the towed vehicle meets or begins to exceed the electromagnetic force, the hydraulic pressure in the line causes a pressure monitoring pin means to act as a piston and apply a mechanical force in opposition to the electromagnetic attracting force. As the hydraulic-mechanical force of the monitoring pin becomes stronger than the magnetic force, it will cause a shift in position of the valve cap, which, in turn, causes the hydraulic pumping means to shut off.

Figure 3:
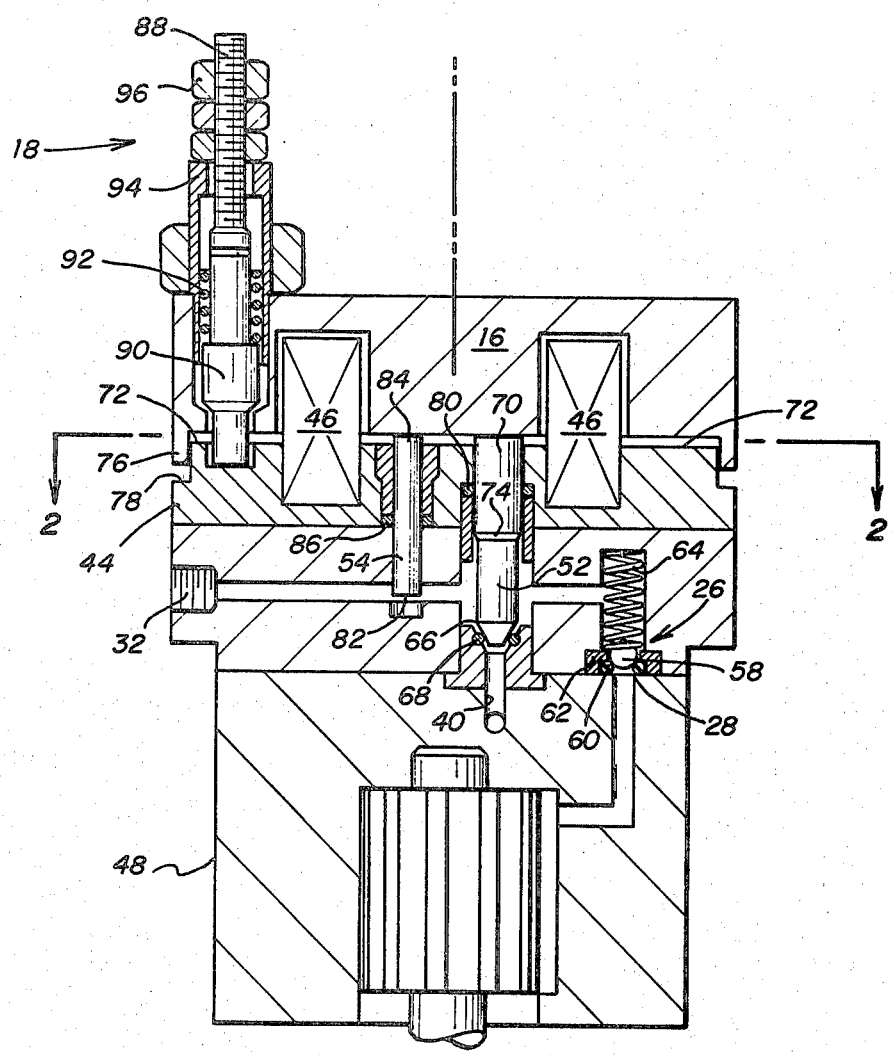
FIG. 3 is a cross sectional view of one embodiment of the novel electromagnetic variable valve means of the present invention.
Figure 4:
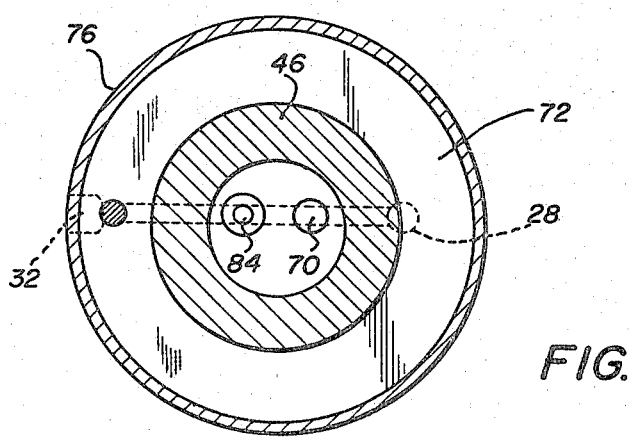
FIG. 4 is a top view of the valve housing means of the variable electro-magnetic valve means of FIG. 3.

An especially preferred embodiment of the valve means 30 of the present invention will now be described with reference to FIGS. 3 and 4. Referring to FIG. 3, valve means 30 is shown to comprise valve cap 16, valve housing means 44 with electromagnetic windings 46 disposed therebetween. Gear pump 48 is depicted in FIG. 3 as being fixed to the bottom of valve means 30 and valve cap switch 18 (further described hereinbelow) is shown mounted in valve cap 16. The valve cap 16, which shifts position slightly during operation (as further described hereinbelow) can be loosely attached to valve housing means 44 via bolt holes (not shown).

Valve housing means 44 basically comprises inlet port 28 which communicates with the output of gear pump 48, outlet port 32 which communicates with the brake lines of the towed vehicle, fluid return port 40 through which a controlled amount of hydraulic fluid is allowed to return to the reservoir of gear pump 48, pressure relief control valve stem means 52 and monitoring pin means 54.

The operation of the valve means 30, depicted in FIGS. 3 and 4, will now be discussed in detail. Hydraulic fluid from gear pump 48 enters inlet port 28 of valve housing means 44 when the electric current signal to the motor driving gear pump 48 is completed by valve cap switch 18 as described above. Check valve means 26, including check ball 58, O-ring 60, seating means 62 and spring 64, insures that hydraulic fluid pumped into valve housing means 44, via inlet port 28, cannot return through that same route to gear pump 48 once that pump stops operation. The hydraulic fluid entering valve housing means 44 passes therethrough and out outlet port 32 and into the brake lines of the towed vehicle.

Pressure relief control valve stem means 52 comprises a first end 66 which can, for example, be conical and which acts to seal fluid return port 40 by seating on O-ring means 68. Second end 70 of pressure control valve stem means 52 extends beyond the valve control surface 72 of valve housing means 44 and contacts valve cap means 16. In this manner, second end 70 of pressure relief control valve stem means 52 acts as a fulcrum upon which the lower surface of valve cap 16 rocks. Intermediate portion 74 of pressure relief control valve stem means 52 includes a variance in cross sectional area so as to provide a hydraulic surface upon which the hydraulic fluid present in valve housing means 44 can act in an upward direction. The electromagnetic force of electromagnetic windings 46 acts to keep valve cap 16 seated on valve housing means 44 (this seated position conveniently can be accomplished by means of rim 76 on valve cap 16 and groove 78 on valve housing means 44). The electromagnetic force is exerted against the hydraulic force transmitted to valve cap 16 mainly via second end 84 of monitoring pin means 54 and also via pressure relief control valve stem means 52, the hydraulic pressure of the latter being created by the hydraulic surface provided by intermediate portion 74 of pressure relief control valve stem means 52. O-ring means 80 insure a tight seal for pressure relief control valve stem means 52. Monitoring pin 54 provides a hydraulic surface 82 which communicates with outlet port 32 and, therefore, the brake lines of the towed vehicle. Monitoring pin means 54 is suitably sealed within valve housing means 44 by O-ring means 86, for example. Since hydraulic surface 82 is larger than the hydraulic surface provided by intermediate portion 74 of pressure relief control valve stem means 52, the force exerted by monitoring pin 54 at its second end 84, which extends beyond valve control surface 72 of valve housing means 44, exceeds the force exerted by pressure relief control valve stem means 52.

The pressure relief control valve stem means 52, monitoring pin 54 and valve cap switch 18 are positioned so as to influence the shift of valve cap 16 when hydraulic pressure and magnetic attraction forces are counteracting. The pressure relief control valve stem means 52 is located off-center with respect to the magnetic field created by electromagnet means 46 and with respect to the center of valve cap 16. Since second end 70 of pressure relief control valve stem means 52 extends beyond valve control surface 72, valve cap 16 "balances" on second end 70 and the lower end of valve cap switch 18, with monitoring pin 54 being located therebetween. When current is applied to electromagnet means 46 the valve cap 16 will "rock" downward as the spring of valve cap switch 18 is compressed, thus starting the hydraulic pumping means 22. The electromagnetic force also holds pressure relief control valve stem means 52 down in a seated position. As pressure within valve housing means 44 builds, monitoring pin 54 is forced hydraulically upward, shifting valve cap 16 upward also. This upward shift causes valve cap switch 18 to return to an open position (stopping the hydraulic pumping means 22) while maintaining valve cap 16 in contact with pressure relief control valve means 52. The pressure then reaches a "static" condition within the brake system of the towed vehicle. If overpressure occurs, the hydraulic surface 74 of pressure relief control valve means 52 will cause it to unseat allowing excess fluid to exit via fluid return port 40. Further, upon reduction of braking pressure by the towing vehicle operator, the electromagnetic force exerted by electromagnet means 46 on valve cap 16 will be reduced. Once such force is reduced below the level of the combined hydraulic force acting on monitoring pin 54 and the hydraulic surface 74 of pressure relief control valve means 52, pressure in the brake liner of the towed vehicle will smoothly be reduced as pressure relief control valve means 52 seats and unseats to allow hydraulic fluid to bleed out of fluid return port 40 to thereby balance the hydraulic pressure with the decreasing electromagnetic force.

Valve cap switch means 18 can comprise an electrical conduction means 88, switch pole 90, spring means 92, housing means 94 and adjustment nuts 96. Spring means 92 keeps switch pole 90 in a normally open relationship with respect to conduction means 88. Only when valve cap 16 is attracted downward toward valve housing 44 does switch pole 90 compress spring means 92 and close into electrical contact with electrical conduction means 88. This connection, in turn, activates the motor relay switch 10 described above which closes the circuit to the electric motor 20 which drives gear pump 48. Thus, whenever the pressure in the brake line of the towed vehicle asserts hydraulic pressure on monitoring pin means 54 and pressure relief control valve stem means 52 and the force exerted thereby on valve cap 16 overcomes the electromagnetic downward force being exerted by electromagnet windings 46, valve cap switch 50 will return to an open position thus stopping the motor. If overpressure has developed some hydraulic fluid is allowed to return to the reservoir via fluid return outlet 40, past pressure relief control valve stem means 52 which, in the case of overpressure will become unseated due to the hydraulic pressure on the hydraulic surface provided by intermediate portion 74 thereof.

While the brake actuating system and electromagnetic variable valve means of the present invention have been described in relation to the preferred embodiments thereof, various adaptations and modifications of the invention will now be apparent to those of ordinary skill in the art. All of such adaptations and modifications as fall within the scope of the appended claims are intended to be covered thereby.

I claim:

1. An electromagnetic hydraulic pressure control valve, comprising:
   a valve structure having a hydraulic passage therein;
   electromagnetic means secured in a fixed relationship to said valve structure for generating a variable electromagnetic field;
   a first member positioned for movement relative to said valve structure, the electromagnetic field exerting a force on said first member with the force being effective on said first member at a first point thereon;
   a switch means operable between open and closed positions by the first member for entering pressurized hydraulic fluid into the hydraulic fluid passage when in the closed position, the force exerted by the electromagnetic field on the first member urging the first member to close the switch means;
   a pressure monitoring structure having a surface of predetermined cross-sectional area exposed to the hydraulic fluid in the hydraulic fluid passage, the force exerted on the surface by the hydraulic fluid being transmitted through the pressure monitoring structure and acting on the first member, the force acting on the first member being effective at a second point thereon;
   a pressure relief control valve stem means movable between open and closed positions for releasing hydraulic fluid from the hydraulic fluid passage to reduce the pressure of the fluid when in the open position, the first member contacting the pressure relief control valve stem means, said pressure relief control valve stem means having a surface of predetermined area exposed to the hydraulic fluid in the hydraulic fluid passage for urging the pressure relief control valve stem means to the open position, the force exerted by the electromagnetic means on the first member urging the pressure relief control valve stem means to the closed position; and
   said electromagnetic hydraulic pressure control valve maintaining the pressure of the hydraulic fluid in the hydraulic fluid passage proportional to the strength of the electromagnetic field generated by said electromagnetic means through balancing of the forces acting on the first member, permitting the switch means to move to the closed position when an increase in hydraulic pressure is necessary and permitting the pressure relief control valve stem means to move to the open position and reduce the pressure when the hydraulic pressure exceeds the desired value.

2. The control valve of claim 1 wherein the surface of predetermined area on the pressure monitoring structure is significantly larger than the area of the surface on the pressure relief control valve stem means so that the position of said pressure monitoring structure is highly sensitive to changes in hydraulic pressure relative to said pressure relief control valve stem means.

3. The control valve of claim 1 wherein said switch means comprises a normally open electrical switch, said switch being closed upon movement of the first member to a selected position when acted on by the electromagnetic field generated by said electromagnetic means.

4. The control valve of claim 1 wherein the first point is between the second point and the point of contact between the first member and the pressure relief control valve stem means so that the first point acts as a fulcrum for the first member.

5. The electromagnetic hydraulic pressure control valve of claim 1 wherein said pressure monitoring structure comprises a pin slidably mounted in said valve structure and having one end exposed to the hydraulic fluid in the hydraulic fluid passage and the opposite end in contact with the first member.

6. The electromagnetic hydraulic pressure control valve of claim 1 wherein said pressure relief control valve stem means includes a valve stem having a first end, a second end, and an intermediate portion, said valve structure having a fluid return port to drain hydraulic fluid from the hydraulic fluid passage, the first end being adapted to seal against the edges of the port in the closed position, said second end contacting the first member and said intermediate portion having a cross-sectional variation forming the surface of predetermined area exposed to the hydraulic fluid in the hydraulic fluid passage.

* * * * *